United States Patent
Pak et al.

(10) Patent No.: US 8,114,372 B2
(45) Date of Patent: Feb. 14, 2012

(54) HIERARCHICAL MESOPOROUS CARBON, METHOD OF MANUFACTURING THE SAME, AND FUEL CELL USING THE SAME

(75) Inventors: Chan-ho Pak, Yongin-si (KR); Hyuk Chang, Yongin-si (KR); Ji-man Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 604 days.

(21) Appl. No.: 12/168,284

(22) Filed: Jul. 7, 2008

(65) Prior Publication Data

US 2009/0098442 A1    Apr. 16, 2009

(30) Foreign Application Priority Data

Oct. 16, 2007   (KR) .................. 10-2007-0104030

(51) Int. Cl.
*C01B 31/00* (2006.01)
*B01J 19/08* (2006.01)
*H01M 8/10* (2006.01)
*B01J 21/18* (2006.01)

(52) U.S. Cl. ......... 423/414; 423/445; 429/481; 502/180
(58) Field of Classification Search .................. None
See application file for complete search history.

(56) References Cited

U.S. PATENT DOCUMENTS

| 6,096,288 | A | 8/2000 | Roth | |
| 6,228,803 | B1 * | 5/2001 | Gadkaree et al. | 502/416 |
| 2004/0024074 | A1 * | 2/2004 | Tennison et al. | 521/99 |
| 2009/0042089 | A1 * | 2/2009 | Choi et al. | 429/40 |

FOREIGN PATENT DOCUMENTS

| KR | 2001-1127 | 1/2001 |
| KR | 10-574022 | 4/2006 |

OTHER PUBLICATIONS

Ding, Jie et al. "Platinum and platinum-ruthenium nanoparticles supported on odered mesoporous carbon and their electrocatalytic performance for fuel cell reactions" 50, 3131-3141 (2005).*
Abstract of Korean Patent Publication No. 2005-116171.

(Continued)

*Primary Examiner* — Melvin Mayes
*Assistant Examiner* — Sheng H Davis
(74) *Attorney, Agent, or Firm* — Lee & Morse, P.C.

(57) ABSTRACT

A hierarchical mesoporous carbon is provided in which a total volume of mesopores of the hierarchical mesoporous carbon is 80% or greater of a total volume of pores of the hierarchical mesoporous carbon; a volume of mesopores with a average diameter greater than 20 nm and no greater than 50 nm is 3% or greater of the total volume of the pores; and a volume of mesopores with a average diameter greater than 2 nm and no greater than 10 nm is 65% or greater of the total volume of the pores. The hierarchical mesoporous carbon, which also contains macropores, has an optimized mesoporous distribution characteristic, and has an increased total volume of pores, thereby having a significantly improved catalytic activity when used as a catalyst support. When such a supported catalyst including the hierarchical mesoporous carbon as a support is used in a fuel cell, supply of fuel and transporting of byproducts are facilitated.

12 Claims, 13 Drawing Sheets

OTHER PUBLICATIONS

"Synthesis of MCM-48 single crystals," Ji Man Kim et al., *Materials Chemistry Laboratory, Department of Chemistry and Center for Molecular Science, Korea Advanced Institute of Science and Technology*, Taeduk Science Town, Taejon, 305-701, Korea, Chem. Commun., 1998, pp. 259-260.

"Synthesis and Pore Size Control of Cubic Mesoporous Silica SBA-1," Mi Jeong Kim et al., *Materials Chemistry Laboratory, Department of Chemistry and Center for Molecular Science, Korea Advanced Institute of Science and Technology*, Taeduk Science Town, Taejon, 305-701, Korea, Chem. Mater. 1999, vol. 11, No. 2, pp. 487-491.

"Application of Large Pore MCM-41 Molecular Sieves to Improve Pore Size Analysis Using Nitrogen Adsorption Measurements," M. Kruk et al., *Langmuir* 1997, vol. 13, No. 23, pp. 6267-6273.

"Triblock Copolymer Syntheses of Mesoporous Silica with Periodic 50 to 300 Angstrom Pores," Dongyuan Zhao et al., *Science* vol. 279, 1998, pp. 548-552.

* cited by examiner

HIERARCHICAL MESOPOROUS CARBON, METHOD OF MANUFACTURING THE SAME, AND FUEL CELL USING THE SAME

CROSS-REFERENCE TO RELATED APPLICATION

This application claims the benefit of Korean Application No. 2007-104030, filed Oct. 16, 2007, in the Korean Intellectual Property Office, the disclosure of which is incorporated herein by reference.

BACKGROUND OF THE INVENTION

1. Field of the Invention

Aspects of the present invention relate to a hierarchical mesoporous carbon, a method of manufacturing the same, and a fuel cell using the same. More particularly, aspects of the present invention relate to a hierarchical mesoporous carbon with macropores and dual mesoporosity, which provides a significantly advantageous structure for diffusion of fuel and release of by-products, a method of manufacturing the same, and a support catalyst with improved activity by using the hierarchical mesoporous carbon as a support, and a fuel cell including an electrode using the same.

2. Description of the Related Art

A fuel cell is an electricity-producing system that produces direct current (DC) electricity from an electrochemical reaction of methanol, water, and oxygen. A typical fuel cell has a structure that includes a proton exchange membrane between an anode and a cathode to which a reagent liquid or a reagent gas is supplied.

In the anode, a catalyst separates protons and electrons from hydrogen or methanol. The protons permeate through the proton conducting membrane and the electrons travel through an external circuit. At the cathode, the protons and electrons react with oxygen in the presence of a cathode catalyst to produce electricity. Thus, the catalysts in such a fuel cell structure have an important role.

In a polymer electrolyte fuel cell, an amorphous carbon support on which Pt particles are dispersed is used as a catalyst for the cathode and the anode. In a direct methanol fuel cell, PtRu is used as the anode and Pt is used as the cathode, either as metal particles themselves, or dispersed within amorphous carbon supports.

Since the main source of the manufacturing cost in a fuel cell is the catalyst, it is desirable to reduce the amount of catalyst in order to achieve a competitive fuel cell price. To this end, active research is underway to reduce the catalyst content used in an anode or a cathode by using a carbon support that can increase catalyst activity or distribution compared to a conventional amorphous carbon support.

As a carbon support, ordered mesoporous carbon (OMC), which is effective as a catalyst support, has been suggested due to its large specific surface area and regularly arranged pores (Korean Patent Laid-Open Publication 2001-0001127). Moreover, a newly structured carbon support with macropores and mesopores has also been introduced (Korean Registration No. 0574022), which is manufactured using a method of preparing a template using silica colloid particles, then wrapping a carbon precursor with the template, thereby forming macropores.

Conventional OMC is useful as a support for a catalyst due to its large specific surface area and regularly arranged pores, but the is much room for improvement in terms of providing better fuel supply and by-product transport characteristics.

SUMMARY OF THE INVENTION

Aspects of the present invention provide a hierarchical mesoporous carbon having a structure advantageous for supplying fuel into a support or transporting by-products when used as a carbon support, and a method of manufacturing the same.

Aspects of the present invention also provide a support catalyst using the hierarchical mesoporous carbon as a support to increase catalyst activity with reduced catalyst particle content, and a fuel cell using the same.

According to an embodiment of the present invention, there is provided a hierarchical mesoporous carbon, wherein a total volume of mesopores is at least 80% of a total volume of pores; a volume of mesopores with a average diameter greater than 20 nm and no greater than 50 nm comprises at least 3% of the total volume of the pores; and a volume of mesopores with a average diameter greater than 2 nm and no greater than 10 nm comprises at least 65% of the total volume of the pores.

According to another embodiment of the present invention, there is provided a hierarchical mesoporous carbon comprising a metal oxide and a mesoporous carbon with an average diameter of 3 to 12 nm.

According to another embodiment of the present invention, there is provided a method of manufacturing a hierarchical mesoporous carbon comprising: impregnating a metal salt-containing aqueous solution comprising a metal salt and water in an OMS (ordered mesoporous silica); forming an OMS-metal oxide complex by heat-treating the resulting product in a first heat-treating process; impregnating a carbon precursor mixture to the OMS-metal oxide complex; forming an OMS-metal oxide-carbon complex by heat treating the resulting product in a second heat-treating process; and treating the OMS-metal oxide-carbon complex with an acidic or a basic solution.

According to another embodiment of the present invention, there is provided a hierarchical mesoporous carbon made by the above method.

According to yet another embodiment of the present invention, there is provided a support catalyst including a hierarchical mesoporous carbon, and a metal catalyst particle supported on the hierarchical mesoporous carbon.

According to yet another embodiment of the present invention, there is provided a fuel cell including a cathode, an anode, and an electrolyte placed between the cathode and the anode, wherein at least one of the cathode and the anode is composed of the support catalyst including the hierarchical mesoporous carbon and a metal catalyst particle supported on the hierarchical mesoporous carbon.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
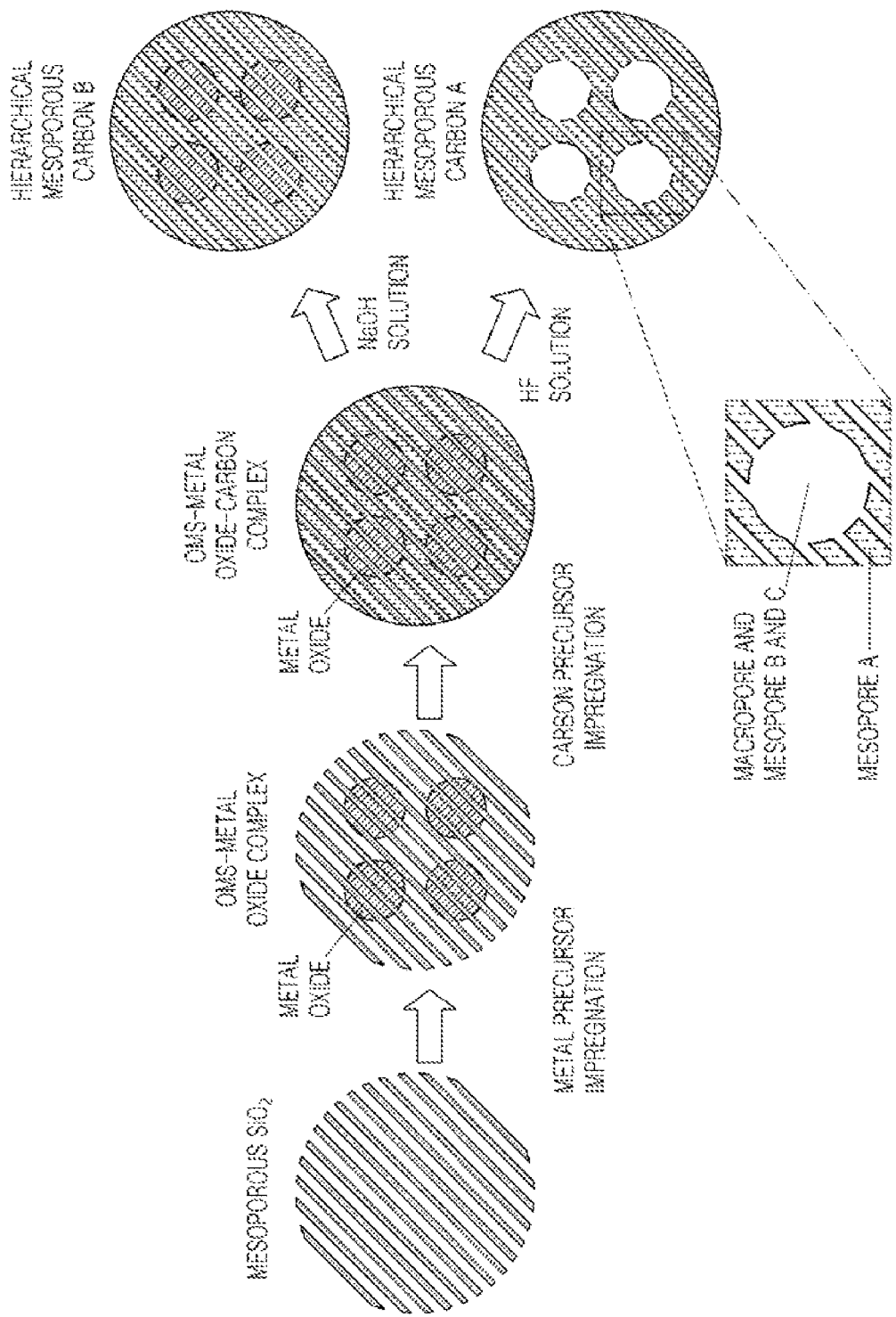
FIG. 1 is a diagram schematically illustrating a process of forming a hierarchical mesoporous carbon and a hierarchical mesoporous carbon-metal oxide complex.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

The hierarchical mesoporous carbon according to aspects of the present invention is an ordered porous carbon having dual mesoporosity and an optimized distribution characteristic of pores, particularly a distribution characteristic of mesopores. Also, the hierarchical mesoporous carbon according to aspects of the present invention has macropores and an increased total volume of pores. Herein, the term "dual mesoporosity" refers to the presence of two large peaks, each representing the distribution of mesopores, in a pore size distribution curve.

The hierarchical mesoporous carbon according to aspects of the present invention includes micropores, macropores, and mesopores, depending on the diameter of the pores. Here, the term "micropores" refers to pores having an average diameter of no greater than 2 nm, and particularly, 0.01 to 2.0 nm; the term "macropores" refers to pores having an average diameter of greater than 50 nm, particularly, 50.1 to 500 nm, and the term "mesopores" refers to pores having an average diameter of greater than 2 nm and no greater than 50 nm.

The mesopores can be further classified into 3 ranges of average diameter. That is, the mesopores are categorized into mesopores A having a pore diameter of greater than 2 nm and no greater than 10 nm, mesopores B having a pore diameter of greater than 10 nm and no greater than 20 nm, and mesopores C having a pore diameter of greater than 20 nm and no greater than 50 nm.

According to aspects of the present invention, the total volume of mesopores may constitute 80% or more, and particularly, 80 to 90% of the total pore volume. If the total volume of mesopores is less than 80% of the total pore volume, the surface area of the manufactured carbon may not be sufficiently large. Here, the term "total pore volume" refers to the combined sum of the volumes of micropores, macropores, and mesopores.

As used herein, the "%" symbol refers to "volume %," which is a volumetric unit for pores.

According to aspects of the present invention, the volume of the mesopores C may be more than 3%, particularly 3 to 4.5% of the total pore volume, and the volume of the mesopores A may be 65% or more, and particularly 65-85.1% of the total pore volume. The volume of the mesopores B may be 6 to 10% of the total pore volume.

If the volume of the mesopores C is less than 3% of the total pore volume, material transport between the exterior and interior of carbon particles may be slowed, and if the volume of the mesopores A is less than 65%, it is difficult to obtain a sufficient specific surface area of the hierarchical mesoporous carbon, and material transport within the particles may be slowed.

In addition, the hierarchical mesoporous carbon according to aspects of the present invention contains macropores dispersed randomly within the carbon particles, and regularly arranged mesopores, providing a significantly advantageous structure for diffusion of fuel and release of by-products. As a non-limiting example, the volume of macropores may constitute 5 to 15.5% of the total pore volume.

As a non-limiting example, the volume of micropores contained in a carbon rod within the hierarchical mesoporous carbon may be no greater than 5%. As a specific non-limiting example, the volume of micropores may range from 0.9% to 5%. As another specific non-limiting example, the volume of micropores may be less than 4%. As another specific non-limiting example, the volume of micropores may range from 0.9% to 4%. If the volume of micropores falls outside this range, transport of fuel or by-products becomes difficult due to a collapse of catalyst particles within the pores.

Moreover, the total pore volume of the hierarchical mesoporous carbon according to aspects of the present invention may be 1.5 to 1.7 cm$^3$/g, or more particularly, 1.63 to 1.65 cm$^3$/g.

Furthermore, a BET surface area of the hierarchical mesoporous carbon according to aspects of the present invention may be 500 m$^2$/g or more, or more particularly, 1300 to 1500 m$^2$/g. The surface area is determined using the BET equation based on the adsorption level of the carbon with a relative pressure of about 0.1 to 0.3 in the adsorption isothermal line obtained through nitrogen adsorption.

According to aspects of the present invention, the pore size distribution, pore volume, and surface area are determined by nitrogen adsorption properties. Nitrogen adsorption is measured using a TRISTAR 3000 Analyzer obtained from Micromeritics Co.

The hierarchical mesoporous carbon according to aspects of the present invention includes mesopores with a orderly arranged structure, such that the main peak of Bragg 2θ angle with regard to Cu k-α X-ray wavelength 1.541 Å in X-ray diffraction analysis is 2 degrees or lower, or, more particularly, 0.5 to 1 degree. Additionally, one or more peaks with relatively weaker intensities may appear between 1 and 2.5 degrees. Using the positions of such peaks, structural analysis can be performed to identify the structure of the mesoporous carbon (space group).

FIG. 1 is a diagram illustrating a process of forming a hierarchical mesoporous carbon and a hierarchical mesoporous carbon-metal oxide complex.

Referring to FIG. 1, first, an ordered mesoporous silica (OMS) template material is impregnated with a metal salt-containing aqueous solution including a metal salt (that is, a metal oxide precursor) and water, and is heat-treated to form an OMS-metal oxide complex. The metal oxide in the OMS-metal oxide complex exists in the pores or between the silica making up the OMS. The average diameter of particles of the metal oxide may be 20 to 200 nm. As non-limiting examples, the metal oxide may be at least one selected from the group consisting of cobalt oxide, iron oxide, and nickel oxide.

Sequentially, the OMS-metal oxide complex is impregnated with a carbon precursor mixture, and is heat treated to form an OMS-metal oxide-carbon complex.

Next, the OMS-metal oxide carbon complex is etched with an acidic solution or a basic solution. If an acidic solution is used, the acidic solution may be an HF solution used in a concentration of 5 to 50 wt %. If a basic solution is used, the basic solution may be an NaOH or KOH solution used in a concentration of 10 to 30 wt %.

If the OMS-metal oxide carbon complex is etched with an acidic solution, such as HF solution, the metal oxide component is removed from the OMS-metal oxide carbon complex, thereby obtaining a hierarchical mesoporous carbon A with macropores and mesopores as shown in FIG. 1.

If the OMS-metal oxide carbon complex is etched with a basic solution such as NaOH solution or KOH solution, only OMS is removed, thereby forming a hierarchical mesoporous carbon B with metal oxide-mesoporous carbon complex.

The hierarchical mesoporous carbon B is made up of a metal oxide and a mesoporous carbon with mesopores having an average diameter of 3 to 12 nm. The metal oxide exists randomly over several pores within the mesoporous carbon particle.

The average particle diameter of the metal oxide is 20 to 200 nm in the hierarchical mesoporous carbon B. As noted above, the metal oxide may be at least one selected from the group consisting of cobalt oxide, iron oxide, and nickel oxide.

Figure 2:
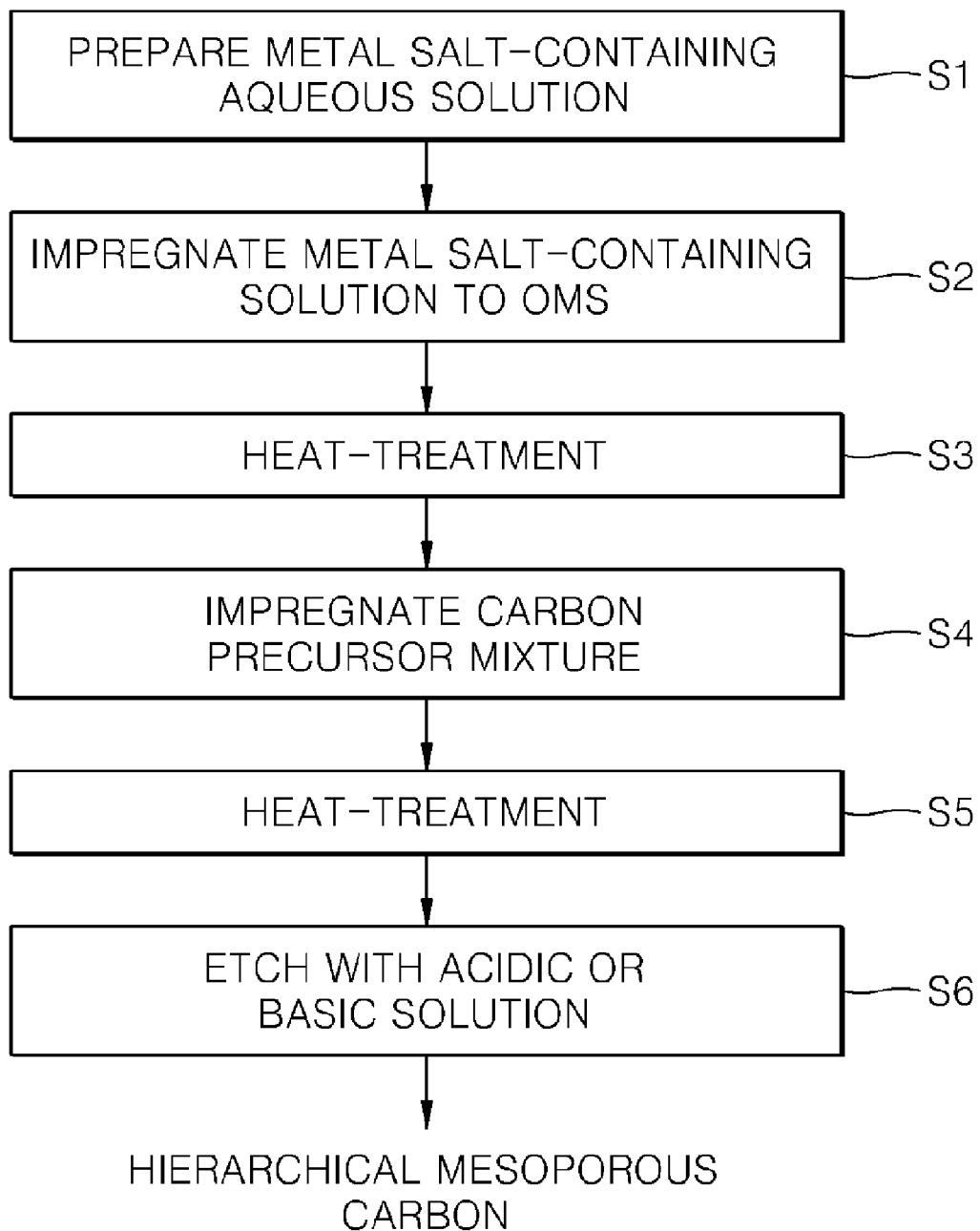
FIG. 2 is a flow chart illustrating a method of manufacturing a hierarchical mesoporous carbon, according to an embodiment of the present invention.

Hereinafter, a method of manufacturing the hierarchical mesoporous carbon according to aspects of the present invention will be described more in detail with reference to FIG. 2. FIG. 2 is a flow chart illustrating a method of manufacturing a hierarchical mesoporous carbon, according to an embodiment of the present invention;

First, a metal salt is dissolved in water to prepare a metal salt-containing aqueous solution (S1). As non-limiting examples, the metal salt may include at least one selected from the group consisting of iron nitrate, cobalt nitrate, nickel nitrate, iron chloride, cobalt chloride, iron sulfate, cobalt sulfate, and nickel sulfate, and the water content may be 50 to 300 parts by weight based on 100 parts by weight of the metal salt.

Sequentially, an OMS is impregnated with the metal salt-containing aqueous solution (S2). As a non-limiting example, the content of the metal salt-containing aqueous solution may be adjusted to be 30-40 parts by weight based on 100 parts by weight of the OMS.

Next, the resultant product is heat-treated in air, converting the metal salt into a metal oxide to form an OMS-metal oxide complex (S3). As a non-limiting example, the temperature for the heat-treatment may be 300 to 700° C. If the heat treatment temperature is less than 300° C., the metal oxide may not crystallize, and if the heat treatment temperature is greater than 700° C., mesopores of the OMS may collapse. The duration of the heat treatment varies depending on the heat treatment temperature, and as a non-limiting example, may be in a range of 2 to 3 hours.

The OMS-metal oxide complex is impregnated with a carbon precursor mixture (S4). The carbon precursor mixture can be prepared by mixing a carbon precursor with a solvent. As non-limiting examples, the carbon precursor may be a carbohydrate such as sucrose, furfuryl alcohol, divinylbenzene, phenol-formaldehyde, resorcinol-formaldehyde, or may be an aromatic compound such as phenanthrene and anthracene. It is to be understood that mixtures of different carbon precursors may be used.

The amount of the carbon precursor may be 50 to 120 parts by weight based on 100 parts by weight of the OMS. If the content of the carbon precursor is less than 50 parts by weight based on 100 parts by weight of the OMS, the mesoporous carbon structure may not form properly, and if the content of the carbon precursor is greater than 120 parts by weight based on 100 parts by weight of the OMS, the precursor may also polymerize outside of the silica particles, causing excessive agglomeration between the particles.

The solvent may be any solvent that is able to evenly disperse the carbon precursor. Specific non-limiting examples of the solvent include water, acetone, methanol, ethanol, isopropyl alcohol, n-propyl alcohol, butanol, dimethylacetamide, dimethylformamide, dimethylsulfoxide, N-methyl-2-pyrrolidone, tetrahydrofuran, tetrabutylacetate, n-butylacetate, m-cresol, toluene, ethylene glycol, γ-butyrolactone, or hexafluoroisopropanol (HFIP). These solvents may be used individually or in combination. The amount of the solvent of the carbon precursor mixture may be 400 to 900 parts by weight based on 100 parts by weight of the OMS. If the solvent content of the carbon precursor mixture is less than 400 parts by weight based on 100 parts by weight of the OMS, the precursor may not be sufficiently dissolved. If the solvent content of the carbon precursor mixture is greater than 900 parts by weight based on 100 parts by weight of the OMS, agglomeration among the particles may become excessive.

The OMS used according to aspects of the present invention may be a molecular sieve material having a structure with 3-dimensional pores interconnected by micropores, but is not limited thereto. The molecular sieve material may be KIT-6, SBA-1, SBA-15, or MCM-48, which are known in the art and can be synthesized according to known methods. (for example, SBA-15: D. Zhao, et al, Science, 1998, vol. 279, pp. 548-552; MCM-48: Kim et al. [Chem. Commun., 1998, 259] and U.S. Pat. No. 6,096,288; SBA-1: Kim and Ryoo [Chem. Mater., 1999, 11, 487]; all incorporated herein by reference).

The impregnation temperature is not specifically limited. For example, the impregnation temperature may be room temperature (20-25° C.).

Once impregnated, the mixture may be dried. The drying temperature is not particularly limited. For example, the drying temperature may be room temperature, and the mixture may be dried under reduced pressure to expedite the drying process.

Then, the impregnated product is heat-treated under a non-oxidative gas atmosphere (S5). In the heat-treatment, the carbon precursor impregnated within the mesoporous silica is structured by carbonization and graphitization to provide an OMS-metal oxide-carbon complex. The heat treatment can be carried out under a temperature range of 600 to 1200° C. The non-oxidative atmosphere may be a vacuum atmosphere, a nitrogen atmosphere or an inert gas atmosphere.

Next, the obtained OMS-metal oxide-carbon complex is etched to remove the OMS and metal oxide, or to remove the OMS only, to thereby obtain a hierarchical mesoporous carbon according to aspects of the present invention. In particular, the OMS-metal oxide-carbon complex may be etched with an HF solution to remove the metal oxide component from the OMS-metal oxide carbon complex, thereby obtaining a hierarchical mesoporous carbon A with macropores and mesopores as shown in FIG. 1. Alternatively, the OMS-metal oxide-carbon complex may be etched with a basic solution such as NaOH or KOH solution such that only the OMS is removed and the hierarchical mesoporous carbon B of FIG. 1 is obtained, comprising a mesoporous carbon-metal oxide complex.

The mesoporous carbon manufactured using the method described above may be used as a catalyst support. A supported catalyst using the support for a catalyst will be described as follows.

The support catalyst includes a heteroatom-containing mesoporous carbon and a metal catalyst particle supported and dispersed within the heteroatom-containing mesoporous carbon. The metal catalyst particle is dispersed on the surface of the mesoporous carbon and within the pores.

The metal catalyst particle that is used as the support catalyst according to aspects of the present invention is not particularly limited, and may be titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tin (Sn), platinum (Pt), ruthenium (Ru), palladium (Pd), tungsten (W), iridium (Ir), osmium (Os), rhodium (Rh), niobium (Nb), tantalum (Ta), lead (Pb), bismuth (Bi), or a combination thereof.

A suitable metal for the catalyst may be selected according to the specific reaction to which the support catalyst can be applied. Moreover, the metal for the catalyst may be an alloy of one or more of the above metals.

As a specific example, in the case where the support catalyst according to aspects of the present invention is used in the catalyst layer of a cathode or an anode in a phosphoric acid fuel cell (PAFC) or proton exchange membrane fuel cell (PEMFC), platinum can be used as the metal for the catalyst. As another specific example, in the case where the support catalyst is used in the catalyst layer of the anode in a direct methanol fuel cell (DMFC), a platinum-ruthenium alloy may be used as the metal for the catalyst. In this case, the platinum-ruthenium atom ratio may be about 0.5:1 to 2:1. As another specific example, in the case where the support catalyst is used in the catalyst layer of the cathode in a DMFC, platinum may be used as the metal for a catalyst.

If the average particle diameter of the metal catalyst is too small, a catalyst reaction may not occur, and if the average particle diameter of the metal catalyst is too big, the reaction surface area of the entire catalyst particles is reduced, thereby slowing catalyst activity. Considering such conditions, the average particle diameter of the metal catalyst particle may be about 1 nm to 5 nm.

If the amount of the metal catalyst particles within the support catalyst is too low, the support catalyst may not be suitable for fuel cells, and if the amount of the metal catalyst particles is too high, the cost becomes high, and the catalyst particle diameter may also increase. Considering such conditions, the amount of the metal catalyst particles in the support catalyst may be 20 to 90 parts by weight based on 100 parts by weight of the support catalyst.

In order to manufacture the support catalyst according to aspects of the present invention, a variety of publicly known support catalyst manufacturing methods may be used. As a representative example thereof, the support catalyst according to aspects of the present invention may be manufactured using a method of impregnating the support with a metal for a catalyst precursor solution, and then reducing the metal for a catalyst precursor. Such methods are disclosed in detail in a variety of documents, and will not be further discussed in the present specification.

Hereinafter, a fuel cell according to aspects of the present invention will be discussed in detail. The fuel cell according to aspects of the present invention includes a cathode, an anode, and an electrolyte layer disposed between the cathode and the anode, wherein at least one of the cathode and the anode contains the previously described support catalyst according to aspects of the present invention.

The fuel cell according to aspects of the present invention may be a PAFC, PEMFC, or DMFC. The structure and method of manufacturing the fuel cell are not particularly limited, and specific examples are publicly disclosed in detail in a variety of documents, and will not be further discussed in the present specification.

Hereinafter, aspects of the present invention are described in more detail with reference to the examples below. However, these examples are for illustrative purposes only and are not intended to limit the scope of the invention.

Example 1

Manufacture of MMC-Fe, a Hierarchical Mesoporous Carbon A 2.9 g of $Fe(NO_3)_3 \cdot 9H_2O$ was dissolved in water to prepare an iron nitrate aqueous solution, and 1 g of KIT-6, an OMS material used as a template, was impregnated with 5.9 g of the iron nitrate aqueous solution.

The resulting product was dried and heat-treated in air at 550° C. for 3 hours, and the iron nitrate was converted to iron oxide to form an OMS-iron oxide complex.

5.56 g of the OMS-iron oxide complex was impregnated with a solution containing 6.25 g of sucrose dissolved in 5 g of water. The impregnated OMS-iron oxide complex was heat-treated under a nitrogen atmosphere at 900° C. for 4 hours. The heat-treated product was etched with an HF solution 50 wt % to obtain a hierarchical mesoporous carbon A product referred to herein as "MMC-Fe."

Example 2

Manufacture of MMC-Co, a Hierarchical Mesoporous Carbon A 2.06 g of $Co(NO_3)_2 \cdot 9H_2O$ was dissolved in water to prepare a cobalt nitrate aqueous solution, and KIT-6 used as a template material was impregnated with 5.06 g of the cobalt nitrate aqueous solution.

The resulting product was dried and baked under air at 550° C. for 3 hours, and the cobalt nitrate was converted to cobalt oxide to form a OMS-cobalt oxide complex, KIT-6-$CO_3O_4$.

5.56 g of the OMS-cobalt oxide complex was impregnated with a solution containing 6.25 g of sucrose dissolved in 5 g of water. The impregnated OMS-cobalt oxide complex was heat-treated under a nitrogen atmosphere at 900° C. for 4 hours to obtain an OMS-cobalt oxide-carbon complex, KIT-6-Co-carbon. The heat-treated product was etched with an HF solution to obtain a hierarchical mesoporous carbon A product referred to herein as "MMC-Co."

Figure 3:
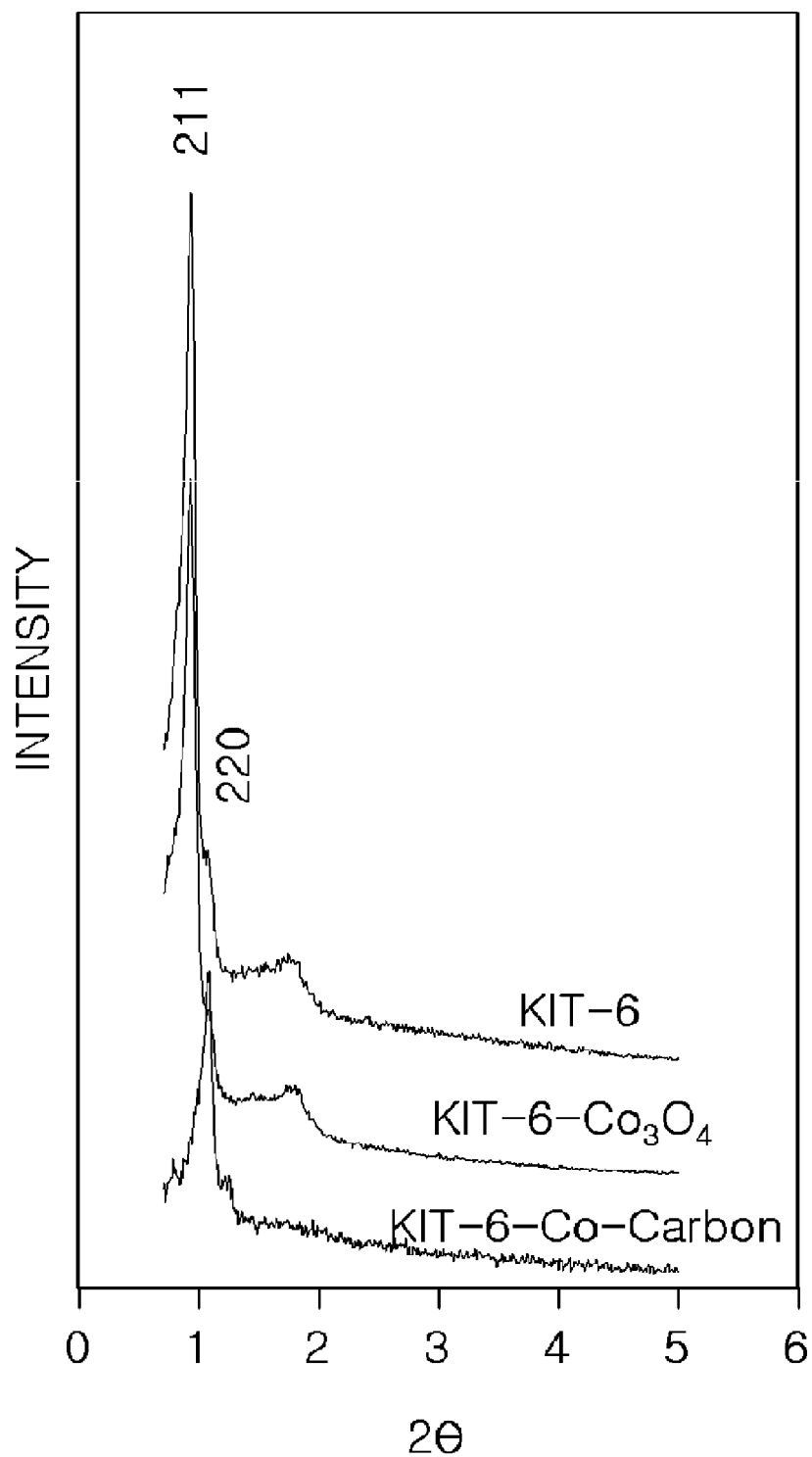
FIG. 3 is a graph representing an X-ray diffraction analysis result of silica template materials of Example 2, that is, KIT-6, KIT-6-CO$_3$O$_4$ and KIT-6-Co-carbon.

The X-ray diffraction characteristics of KIT-6, KIT-6-$CO_3O_4$, and KIT-6-Co-carbon used for the silica template material of Example 2 were examined, and the results are shown in FIG. 3. Referring to FIG. 3, it can be seen that the mesoporous structure does not collapse during any process of synthesis.

Example 3

Manufacture of MMC-Ni, a Hierarchical Mesoporous Carbon A

Hierarchical mesoporous carbon was manufactured using the same method as Example 1, except that a nickel nitrate aqueous solution obtained by dissolving 2.87 g of $Ni(NO_3)_3 \cdot 9H_2O$ in water was used instead of the iron nitrate aqueous solution, thereby producing a hierarchical mesoporous carbon A represented as "MMC-Ni."

Example 4

Manufacture of a Hierarchical Mesoporous Carbon B

Hierarchical mesoporous carbon B was manufactured using the same method as Example 2, except that 10 wt % of an NaOH aqueous solution was used instead of the HF solution for the etching.

Example 5

Manufacture of a Hierarchical Mesoporous Carbon B

Hierarchical mesoporous carbon was manufactured using the same method as Example 3, except that 10 wt % of an NaOH aqueous solution was used instead of the HF solution for the etching.

Figure 4:
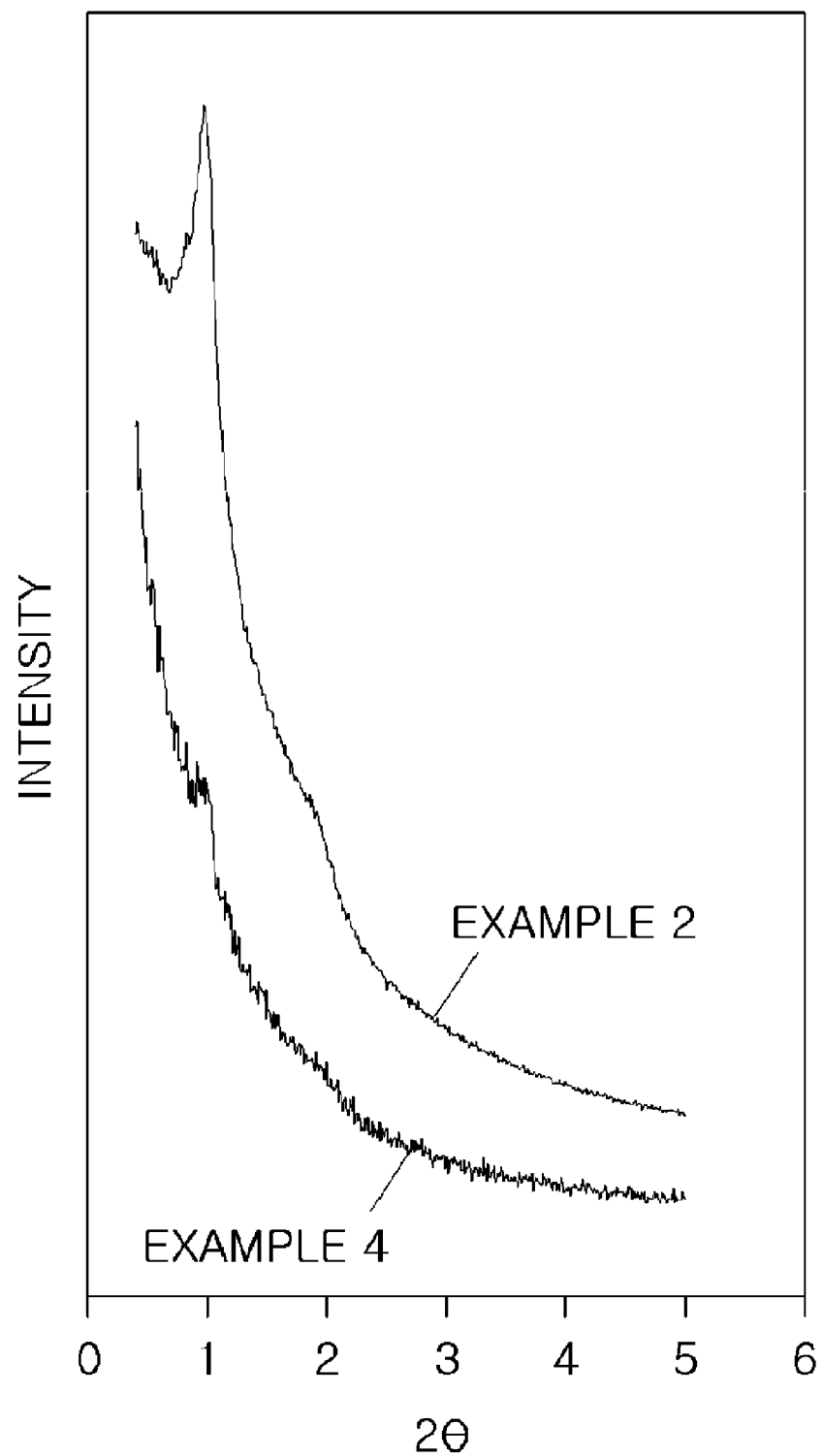
FIG. 4 is a graph representing an X-ray diffraction analysis result of the hierarchical mesoporous carbon obtained according to Example 2, and the hierarchical mesoporous carbon obtained according to Example 4.

The X-ray diffraction characteristics of the hierarchical mesoporous carbons obtained according to Examples 2 and 4 were examined, and the results are shown in FIG. 4.

Referring to FIG. 4, it can be seen that the mesoporous structure in the material made with the carbon of Example 2, that is, the carbon without metal oxide, is well developed, but in the case of the $Co_3O_4$—C complex made according to Example 4, the mesoporous structure is somewhat collapsed, or the X-ray diffraction signals are reduced due to the metal oxides existing within the particles.

Figure 5:
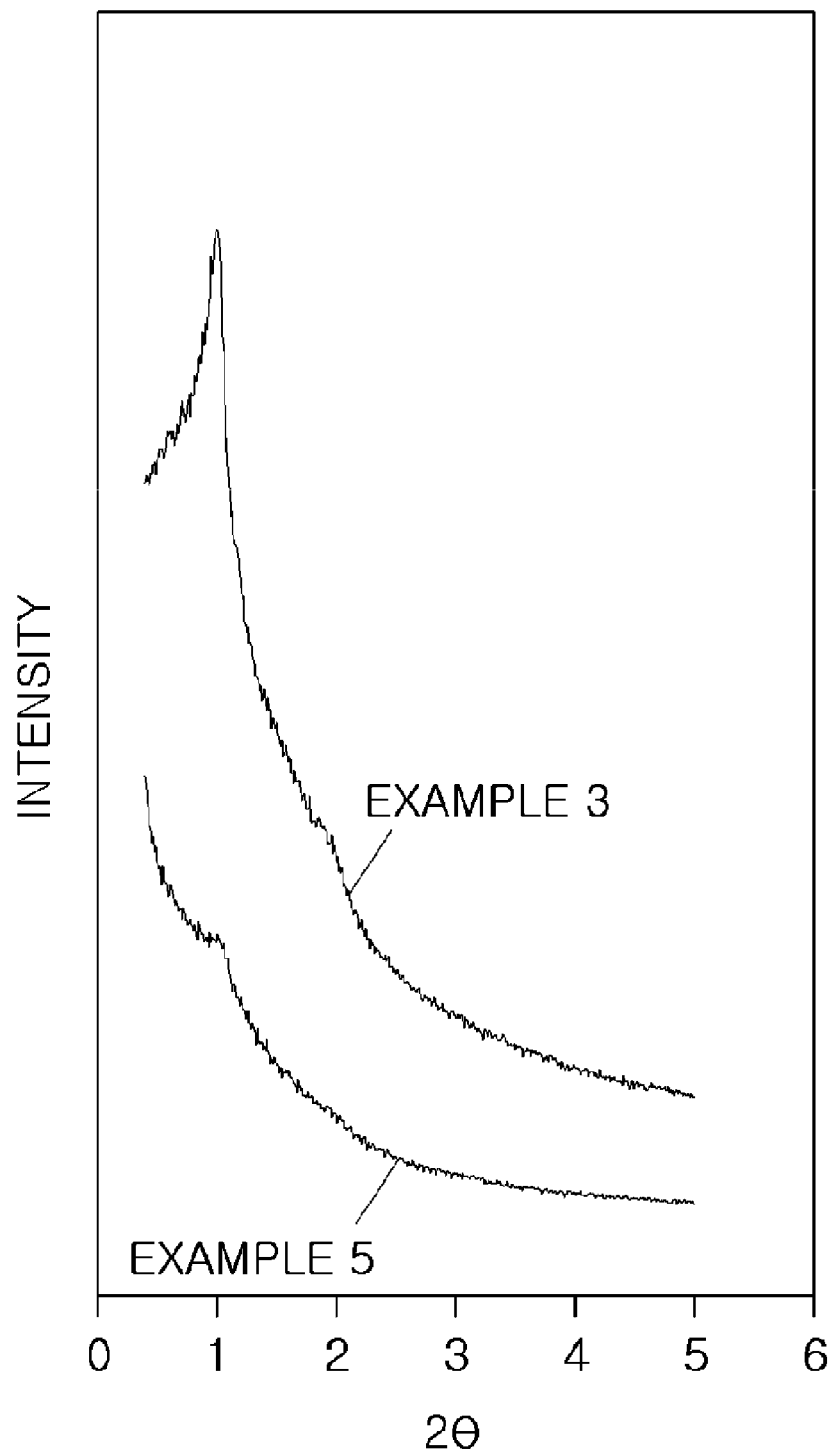
FIG. 5 is a graph representing an X-ray diffraction analysis result of the hierarchical mesoporous carbon obtained according to Example 3, and the hierarchical mesoporous carbon obtained according to Example 5.

Moreover, the X-ray diffraction characteristics of the hierarchical mesoporous carbons obtained according to Examples 3 and 5 were examined, and the results are shown in FIG. 5. Referring to FIG. 5, it can be seen that, as also shown in Examples 2 and 4, the mesoporous structure of Example 3, in which all of the metal oxides and silica are removed and only carbon makes up the pores, is better developed.

Figure 6A:
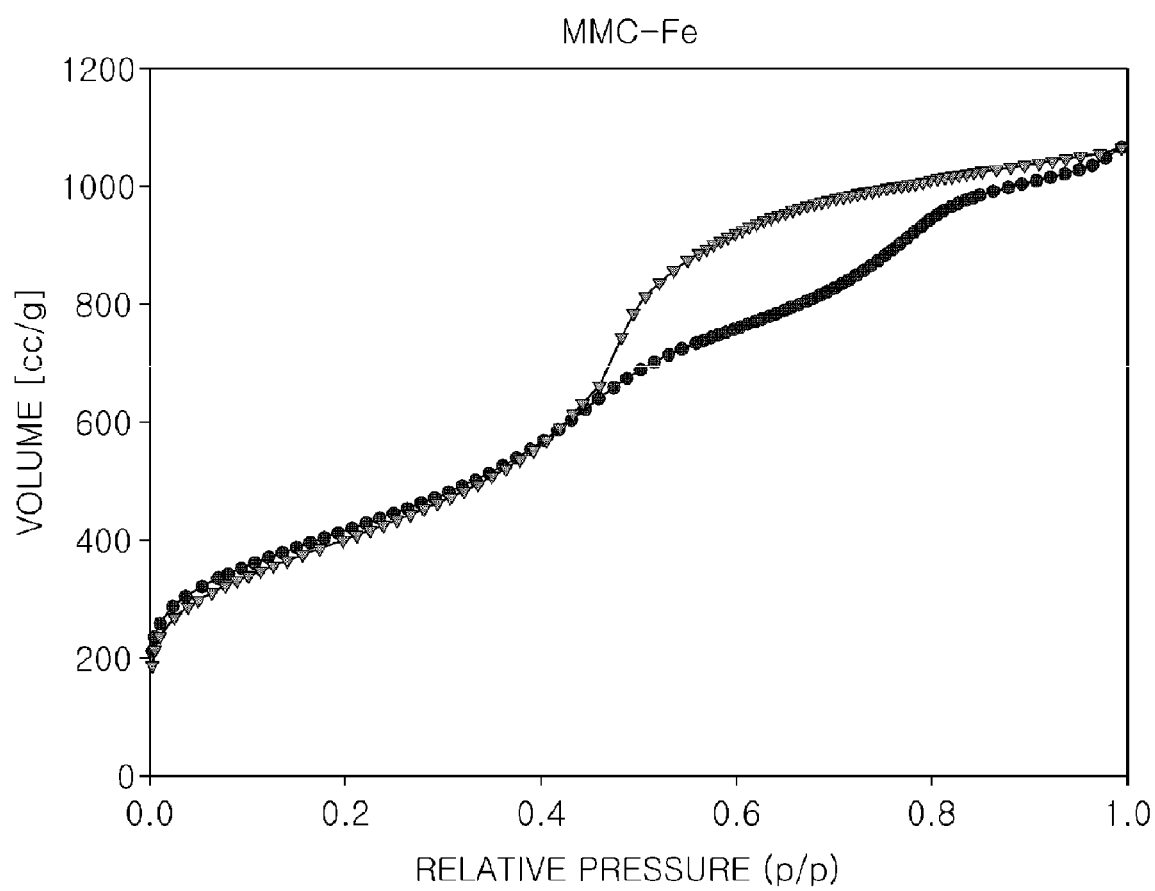
FIG. 6A is a graph of the nitrogen adsorption and desorption isotherms.
Figure 6B:
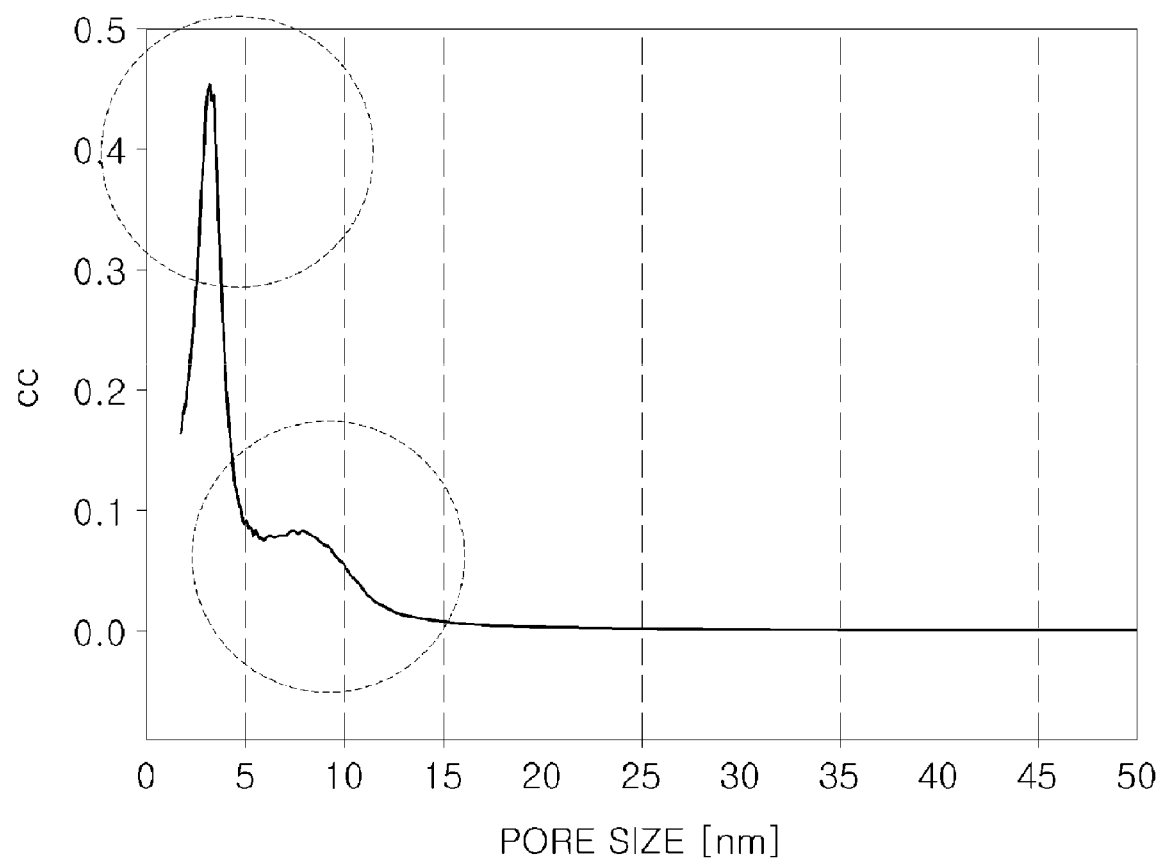
FIG. 6B is a graph of the calculated pore size distribution of MMC-Fe obtained according to Example 1.

The pore size distribution, surface area, and pore volume of MMC-Fe obtained according to Example 1 were examined using nitrogen adsorption measurements, and the results are shown in FIGS. 6A and 6B. Here, the pore size distribution was calculated using the Barrett-Joyner-Halenda (BJH) method, which uses the Kelvin equation to calculate the size of mesopores and obtain the distribution of the mesopores. Reference: M. Kruk, M. Jaroniec, A. Sayari, Langmuir, 13, 6267 (1997), and the surface area was evaluated using the BET method as mentioned above. Referring to FIG. 6A, it can be seen that the nitrogen adsorption isotherms of MMC-Fe of Example 1 are those of a typical mesoporous material. Referring to FIG. 6B, the average diameter of the mesopores was determined to be about 4 nm. Further, the surface area was determined to be 1496 $m^2/g$ and the total pore volume was determined to be 1.65 $cm^3/g$.

Figure 7A:
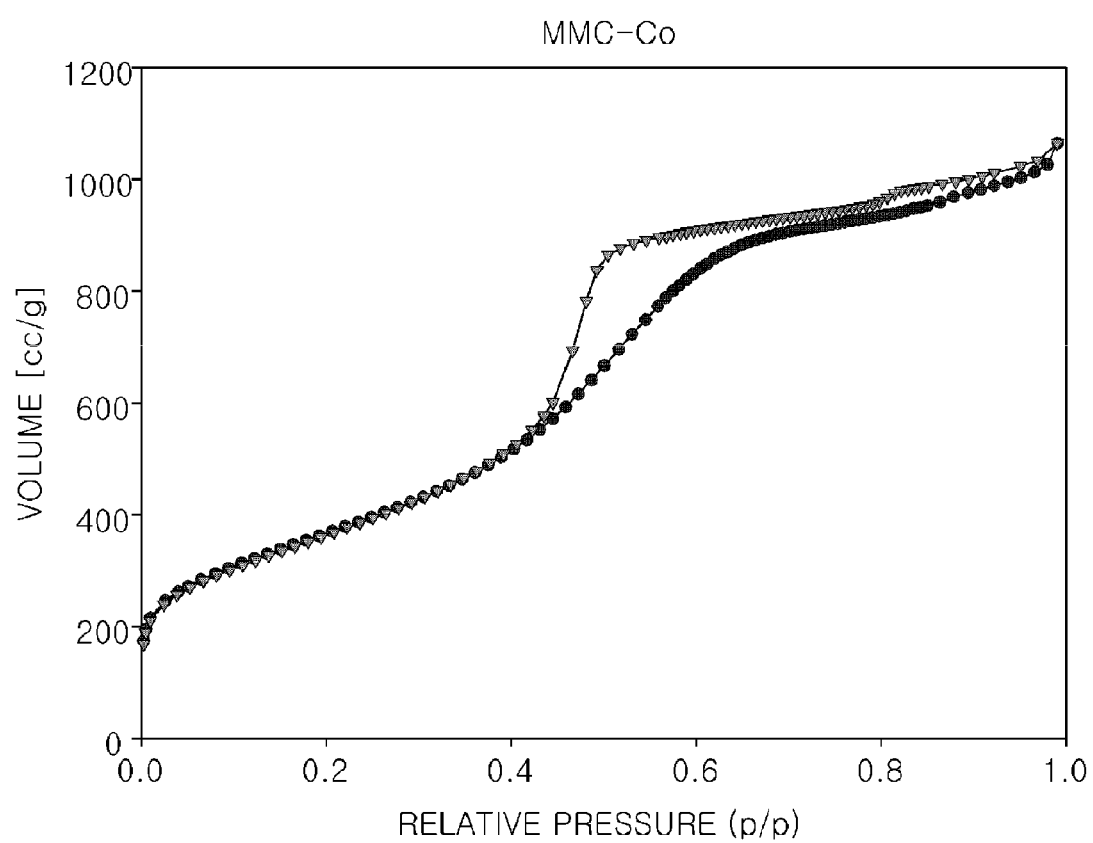
FIG. 7A is a graph of the nitrogen adsorption and desorption isotherms and FIG. 7B is a graph of the calculated pore size distribution of MMC-Co obtained according to Example 2.
Figure 7B:
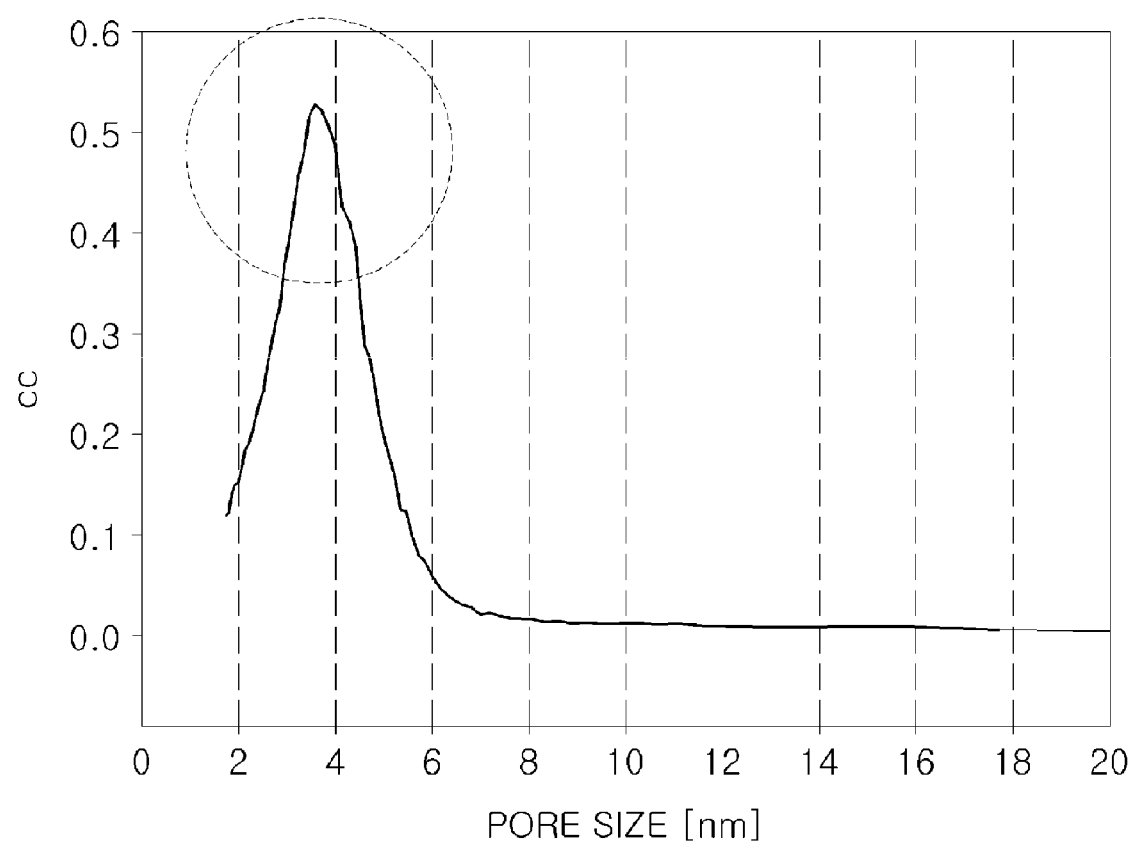

The pore size distribution, surface area, and pore volume of MMC-Co obtained according to Example 2 were examined in the same manner as MMC-Fe of Example 1, using the nitrogen adsorption measurement, and the results are shown in FIGS. 7A and 7B. Referring to FIG. 7A, it can be seen that the nitrogen adsorption isotherms of MMC-Co of Example 2, as with MMC-Fe of Example 1, are those of a typical mesoporous material. Referring to FIG. 7B, the average diameter of the mesopores was determined to be about 4 nm. Further, the surface area was determined to be 1336 $m^2/g$ and the total pore volume was determined to be 1.65 $cm^3/g$.

A transmission electron microscopy (TEM) image of the MMC-Co obtained according to Example 2 showed that the MMC-Co obtained according to Example 2 has macropores having diameters of 100-150 nm.

Figure 8A:
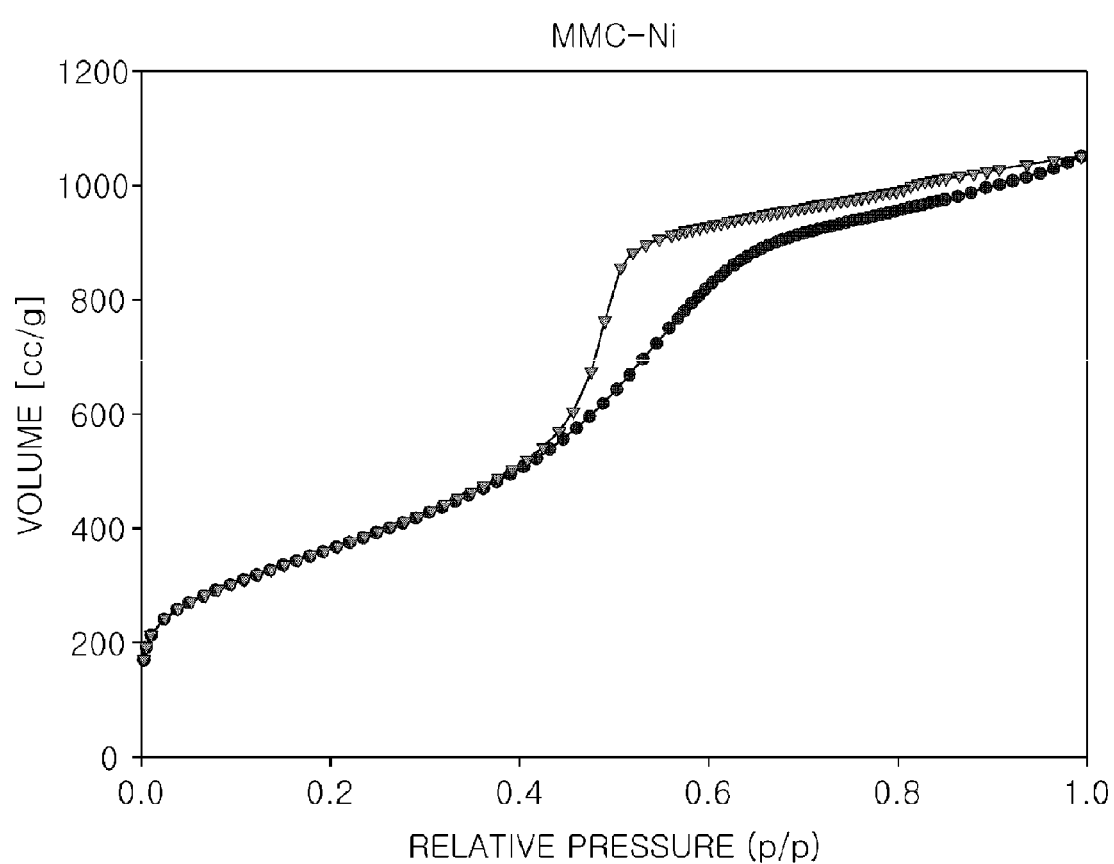
FIG. 8A is a graph of the nitrogen adsorption and desorption and FIG. 8B is a graph of the calculated pore size distribution of MMC-Ni obtained according to Example 2.
Figure 8B:
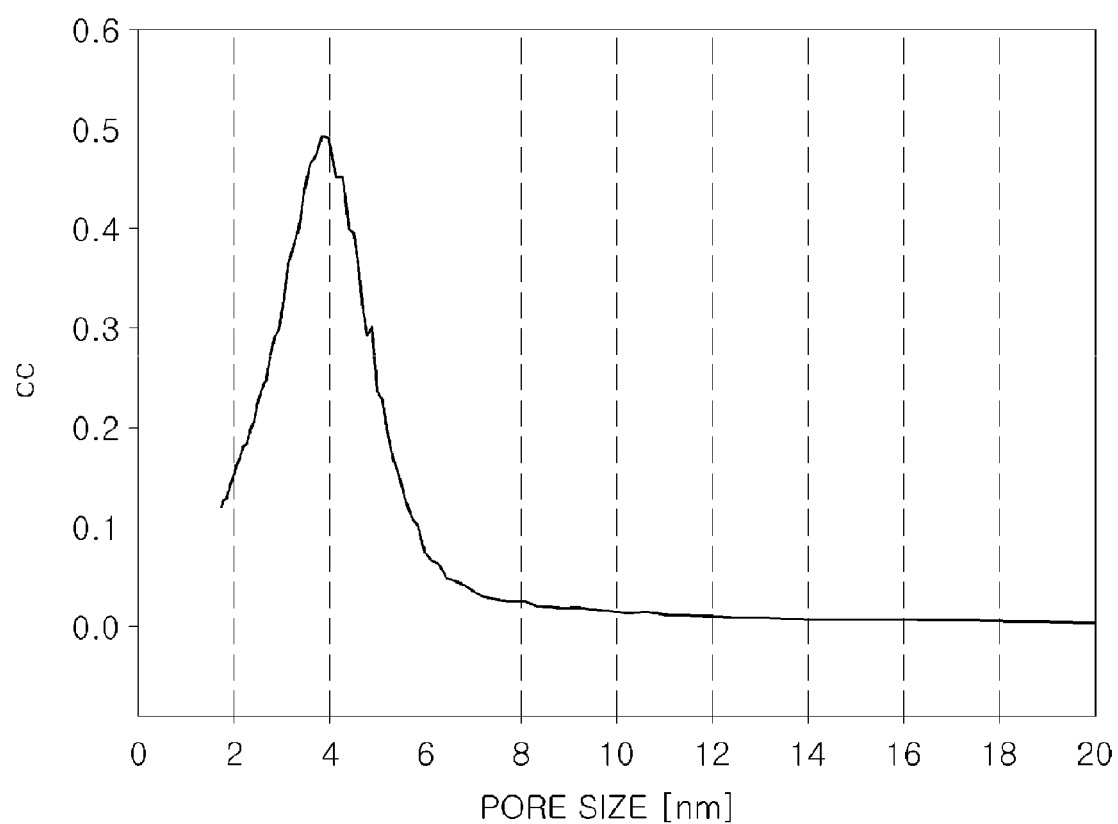

The pore size distribution, surface area, and pore volume of MMC-Ni obtained according to Example 3 were examined in the same manner as MMC-Fe of Example 1, using the nitrogen adsorption measurement, and the results are shown in FIGS. 8A and 8B. Referring to FIG. 8A, it can be seen that the nitrogen adsorption isotherms of MMC-Ni of Example 3, as with MMC-Co of Example 2, are those of a typical mesoporous material. Referring to FIG. 8B, the average diameter of the mesopores was determined to be about 4 nm. Further, the surface area was determined to be 1329 $m^2/g$, and the total pore volume was determined to be 1.63 $cm^3/g$.

A TEM image of the MMC-Ni obtained according to Example 3 showed that the MMC-Ni obtained according to Example 3 has macropores having diameters of 50-100 nm.

The pore size distribution and total pore volume evaluated using the above-described nitrogen adsorption isotherms are shown in Table 1 below.

TABLE 1

| | Sample | | OMC | MMC-Fe (Example 1) | MMC-Co (Example 2) | MMC-Ni (Example 3) |
|---|---|---|---|---|---|---|
| Pore size distribution | $V_{micro}$ ($cm^3/g$) | 2 nm or less | 0.020 (1.3%) | 0.060 (3.6%) | 0.035 (2.1%) | 0.031 (1.9%) |
| | $V_{meso}$ ($cm^3/g$) | Greater than 2 nm and less than 10 nm | 1.235 (82.9%) | 1.142 (69.2%) | 1.215 (73.6%) | 1.272 (78.0%) |
| | | Greater than 10 nm and less than 20 nm | 0.102 (6.8%) | 0.156 (9.5%) | 0.125 (7.6%) | 0.120 (7.4%) |

TABLE 1-continued

| Sample | | OMC | MMC-Fe (Example 1) | MMC-Co (Example 2) | MMC-Ni (Example 3) |
|---|---|---|---|---|---|
| | Greater than 20 nm and less than 50 nm | 0.012 (0.8%) | 0.053 (3.2%) | 0.069 (4.2%) | 0.063 (3.9%) |
| | Subtotal of $V_{meso}$ | 1.349 (90.5%) | 1.351 (81.9%) | 1.409 (85.4%) | 1.455 (89.3%) |
| $V_{macro}$ $(cm^3/g)$ | Greater than 50 nm | 0.121 (8.1%) | 0.239 (14.5%) | 0.210 (12.7%) | 0.144 (8.8%) |
| Total Pore Volume $(cm^3/g)$ | | 1.49 | 1.65 | 1.65 | 1.63 |

In Table 1 above, $V_{micro}$, $V_{meso}$, and $V_{macro}$ refer to the volumes of micropores, mesopores, and macropores, respectively. OMC is a mesoporous carbon manufactured using a conventional synthesis method, which does not include forming a metal oxide.

Example 6

Manufacture of Supported Catalyst 40 parts by weight of MMC-Co produced according to Example 2 above was supported on 60 parts by weight of platinum, using the following gas reduction method to prepare a support catalyst.

0.5 g of MMC-Co obtained from Example 2 was placed in a plastic bag. 0.9375 g of $H_2PtCl_6$ was dissolved in 1.5 ml of acetone, and the solution was added to the plastic bag containing the mesoporous carbon and mixed.

After drying the mixture solution in air for 4 hours, the mixture was transferred to a crucible and dried overnight in a drier oven at 60° C. Next, the crucible was placed in an electric furnace, and nitrogen was flowed through the electric furnace for 10 minutes. Then, the gas was switched to hydrogen. Then, the temperature was increased from room temperature to 200° C. and maintained for 2 hours, to reduce the platinum salt supported on the MMC-Co. The gas was switched again to nitrogen, and the temperature was increased to 250° C. at a rate of 5° C./min, maintained at 250° C. for 2 hours, and then was slowly cooled down to room temperature. Then, the mixture was impregnated again with the solution of 0.9375 g of $H_2PtCl_6$ dissolved in 1.5 ml acetone, and a second reduction was carried out under the same conditions described above to obtain a supported catalyst with a platinum support concentration of 60 wt %.

Example 7

Manufacture of Supported Catalyst

A supported catalyst was obtained using the same method as Example 6, except that MMC-Ni produced from Example 3 was used instead of MMC-Co produced from Example 2.

Example 8

Manufacture of a Fuel Cell

The supported catalyst of Example 6 above was dispersed in an isopropyl alcohol solution with dispersed NAFION 115 (manufactured by Dupont Co.) to produce a slurry, and then the slurry was coated onto carbon paper using a spraying process. The coating concentration of the supported catalyst was 3 mg/cm² based on the platinum content. Successively, the electrode-forming body was put through a rolling machine to produce a cathode having a maximized bonding capacity between a catalyst layer and a carbon paper is maximized.

Meanwhile, an anode was produced using a conventional PtRu black catalyst, and a fuel cell including the cathode and anode was manufactured.

Example 9

Manufacture of a Fuel Cell

A fuel cell was manufactured using the same method as Example 8, except that the supported catalyst of Example 7 was used instead of the supported catalyst of Example 6.

Reference Example 1

Manufacture of a Support Catalyst and a Fuel Cell

A fuel cell was manufactured using the same method as Example 8, except that a conventional supported catalyst (HISPEC 9100, commercially available from Johnson Matthey Co.) was used instead of the support catalyst of Example 4.

Figure 9:
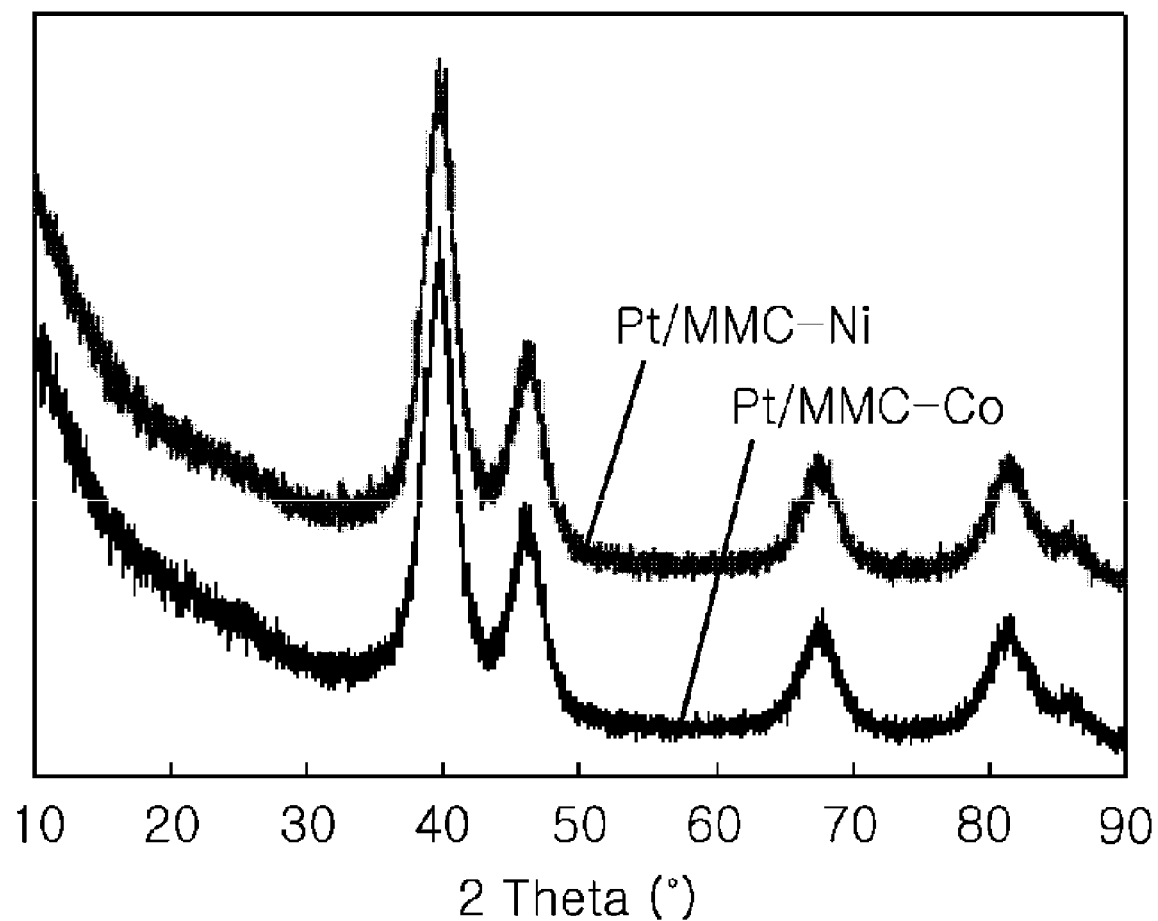
FIG. 9 is a graph representing an XRD characteristic analysis result with regards to the supported catalyst according to Examples 6 and 7.

XRD characteristics of the support catalysts obtained according to Examples 6 and 7 were examined, and the results are shown in FIG. 9. Referring to the XRD characteristics of FIG. 9, it can be determined that the diameter of platinum particles supported on the support catalyst according to Examples 6 and 7 was 3.2 nm.

Figure 10:
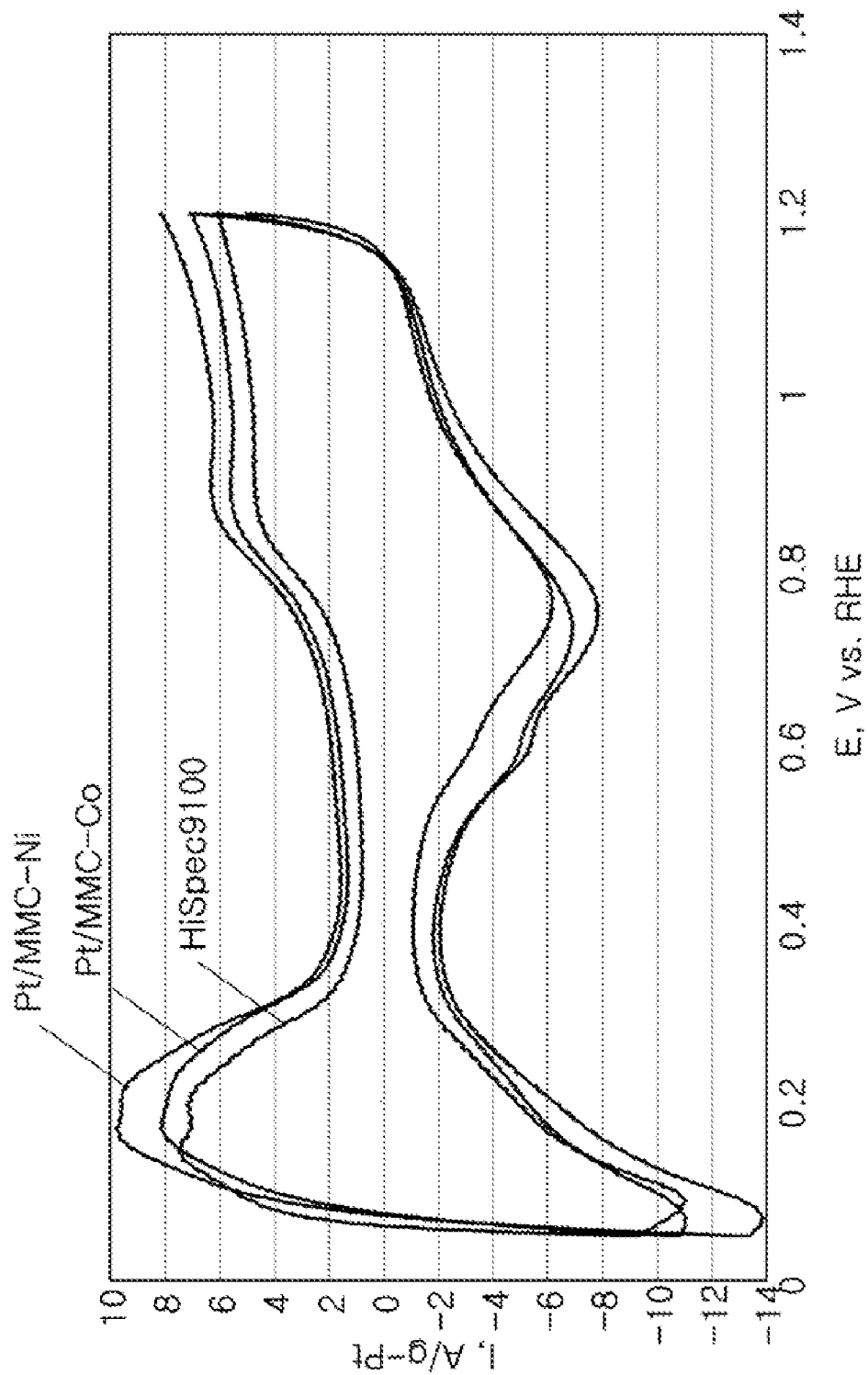
FIG. 10 is a graph representing electrochemical surface area measurement results with regards to supported catalysts of Examples 6 and 7, and HiSpec 9100 which is a conventional support catalyst of Reference Example 1.

The electrochemical surface area of the support catalysts of Examples 6 and 7 and the conventional support catalyst (HISPEC 9100) of Reference Example 1 above was examined. FIG. 10 is a graph representing the electrochemical surface area measurement results. Referring to FIG. 10, the conventional catalyst HISPEC 9100 had a surface area of 60.4 m²/g, and Pt/MMC-Co and Pt/MMC-Ni had surface areas of 60.6 and 71.6 m²/g, respectively. Thus, it was shown that the MMC support catalysts had equivalent or greater electrochemical surface areas compared to the conventional support catalyst. Such support catalysts manufactured according to aspects of the present invention provide increased catalytic activity. That is, the supported catalysts have Pt particles larger than those of the conventional catalyst, but the presence of macropores provides a significantly advantageous structure for diffusion of fuel and release of by-products, thereby increasing the utilization rate of the catalyst particles and the specific electrical surface area.

The hierarchical mesoporous carbon according to aspects of the present invention has achieved an optimized mesoporous distribution characteristic, containing macropores, and has an increased total pore volume, thereby having a significantly improved catalytic activity when used as a catalyst support. Therefore, when such support catalyst including the hierarchical mesoporous carbon as a support is used in a fuel cell, supply of fuel and transporting of by-products are facilitated.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hierarchical mesoporous carbon including regularly arranged mesopores and randomly dispersed macropores, wherein a total volume of mesopores is at least 80% of a total volume of pores; a volume of mesopores with an average diameter greater than 20 nm and no greater than 50 nm comprises at least 3% of the total volume of the pores; and a volume of mesopores with an average diameter greater than 2 nm and no greater than 10 nm comprises at least 65% of the total volume of the pores.

2. The hierarchical mesoporous carbon of claim 1, wherein the volume of mesopores with an average diameter greater than 2 nm and no greater than 50 nm is 80 to 90% of the total volume of the pores.

3. The hierarchical mesoporous carbon of claim 1, wherein the volume of mesopores with an average diameter greater than 2 nm and no greater than 10 nm is 65 to 85.1% of the total volume of the pores.

4. The hierarchical mesoporous carbon of claim 1, wherein the volume of mesopores with an average diameter greater than 20 nm and no greater than 50 nm is 3 to 4.5% of the total volume of the pores.

5. The hierarchical mesoporous carbon of claim 1, wherein the volume of mesopores with an average diameter greater than 10 nm and no greater than 20 nm is 6 to 10% of the total volume of the pores.

6. The hierarchical mesoporous carbon of claim 1, wherein the main peak of a Bragg angle 2θ with regards to CuK-α X-ray wavelength 1.541 Å appears at least at 2 degrees or below.

7. The hierarchical mesoporous carbon of claim 1, wherein a BET surface area of the hierarchical mesoporous carbon is 500 $m^2/g$ or greater.

8. The hierarchical mesoporous carbon of claim 1, wherein the total volume of the pores is 1.5 to 1.7 $cm^3/g$.

9. The hierarchical mesoporous carbon of claim 1, wherein:
the volume of mesopores with an average diameter greater than 2 nm and no greater than 10 nm is 69.2 to 78.0% of the total volume of the pores,
the volume of mesopores with an average diameter greater than 10 nm and no greater than 20 nm is 7.4 to 9.5% of the total volume of the pores, and
the volume of mesopores with an average diameter greater than 20 nm and no greater than 50 nm is 3.2 to 4.2% of the total volume of the pores.

10. The hierarchical mesoporous carbon of claim 1, wherein the volume of macropores with an average diameter greater than 50 nm is 8.8 to 14.5%.

11. A support catalyst including a hierarchical mesoporous carbon of claim 1, and metal catalyst particles supported on the hierarchical mesoporous carbon.

12. A fuel cell including a cathode, an anode, and an electrolyte placed between the cathode and the anode, wherein at least one of the cathode and the anode is composed of a support catalyst including a hierarchical mesoporous carbon of claim 1 and a metal catalyst particle supported on the hierarchical mesoporous carbon.

* * * * *